June 27, 1933. W. M. HASKINS 1,915,607
VEHICLE SHOCK ABSORBER
Original Filed July 29, 1930
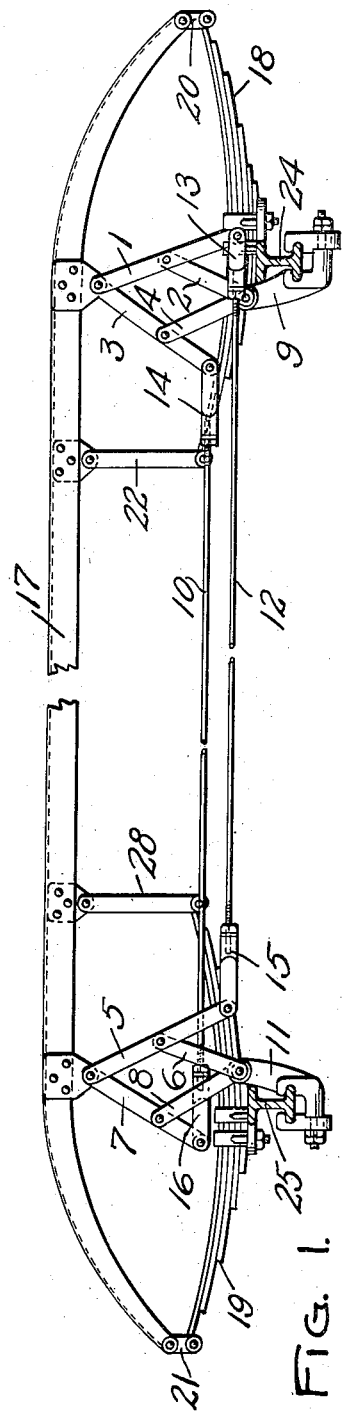
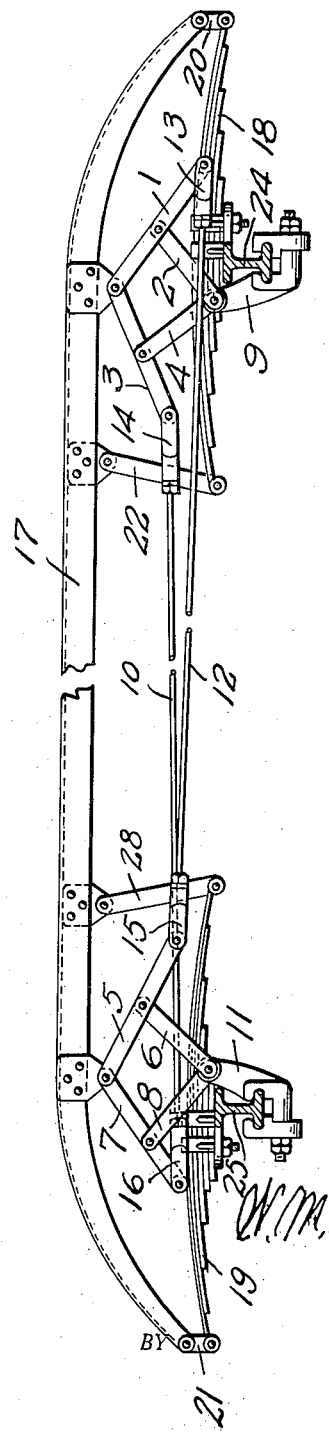
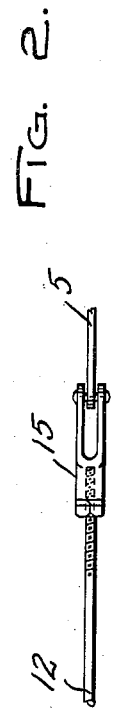
INVENTOR.

Patented June 27, 1933

1,915,607

UNITED STATES PATENT OFFICE

WILLIAM M. HASKINS, OF DEMING, NEW MEXICO

VEHICLE SHOCK ABSORBER

Application filed July 29, 1930, Serial No. 471,492. Renewed March 9, 1933.

This invention relates to improvements in equalizing devices for vehicles, wherein a shock imparted to a wheel on one axle is partially transferred to a wheel on another axle.

The salient object of the invention is to provide a shock absorber that employs two of the vehicle springs in eliminating the excessive up and down motion of the body of the vehicle.

This and other objects of the invention will appear in the following description, when taken in connection with the accompanying drawing.

In the drawing;

Fig. 1 is a side elevation of a vehicle with my invention in one position.

Fig. 2 is a corresponding view but with the elements in another position.

Fig. 3 is an enlarged view of a clip on the end of a pull rod.

The following detailed description of my invention is given to only one side of the vehicle as both sides are identical.

The arrangement of links shown in Figures 1 and 2 is intended to be used between the axles and frame on both sides of the vehicle, but inasmuch as both sides are identical only one will be described.

A vehicle frame is shown at 17 mounted on axles 24 and 25 by means of springs 18 and 19. These springs are connected to the frame at their outer ends by shackles 20 and 21, and at their inner ends by shackles 22 and 23.

Rigidly clamped on axle 24 is a bracket 9. This bracket carries links 2 and 4 which are pivotally mounted on a common axis thereon. Pivotally mounted at a point on the frame substantially directly above the bracket, are two links 1 and 3. The ends of links 2 and 4 remote from the bracket are pivotally connected to the centers of brackets 1 and 3 respectively, forming roughly a quadrilateral.

The construction between the other axle 25 and the corresponding end of the frame is the same, bracket 11 and links 5, 6, 7 and 8 corresponding to bracket 9 and links 1, 2, 3, and 4 respectively.

Pivotally connected to the free end of link 1 is a pull rod 12 the other end of which is pivotally connected to the free end of link 5. Another pull rod 10 is pivotally connected to the free ends of links 3 and 7 respectively.

These pull rods 10 and 12 are threaded into bifurcated clips 14 and 16 and clips 13 and 15 respectively in order that their lengths may be adjusted to pull evenly.

Fig. 3 shows the connection between the pull rod 12 and link 5.

The operation of the device is as follows: When a wheel (not shown) on axle 24 strikes a protuberance in the road, the axle is forced upwardly relative to the frame thus forcing the links 1, 2, 3, and 4 to take the position in Fig. 2. Rod 10 is thus put in compression and rod 12 in tension, and they exert corresponding forces on links 7 and 5 which are forced to take the position in Fig. 2. It will be seen that in such a case the direction of motion between frame and axle is the same at each end. Consequently instead of all the shock being taken by one axle part of it is transmitted to the other axle. On recoil of springs 18 the motion is reversed.

When the wheel on axle 25 (not shown) strikes a protuberance in the road, the axle is forced upward relative to the frame thus forcing the links 5, 6, 7 and 8 to take the position in Fig. 2. Rod 12 is thus put in compression and rod 10 in tension thus causing the same motion and dividing the shock in the same manner as in the aforesaid case.

Having thus described my invention, what I claim is:

The combination with a vehicle chassis frame having front and rear axles and springs connecting the axles and frame, of two links pivoted at their adjacent ends to each axle, two links pivoted at their adjacent ends on the frame at a point above each axle, the free ends of the first mentioned links being pivoted to the other links intermediate the ends of the latter, thus forming a quadrilateral between each axle and the frame, and pull rods connecting the free ends of the links on the frame above one axle respectively to the free ends of the corresponding links above the other axle.

WILLIAM M. HASKINS.